Nov. 5, 1968  K. A. SPARING ETAL  3,408,808
WATCH VIBRATOR

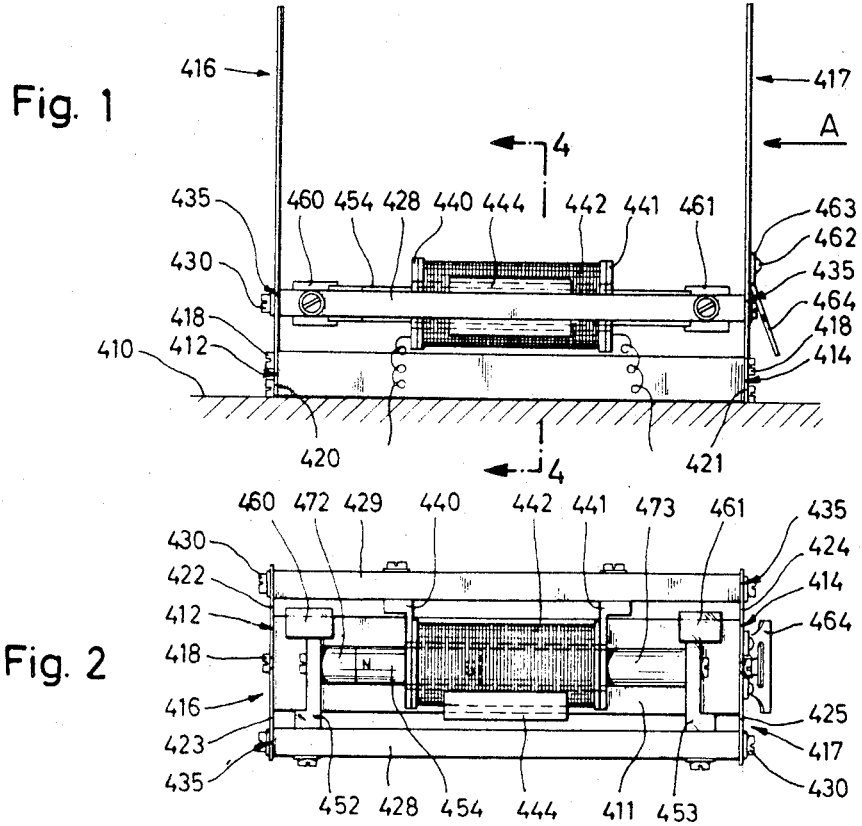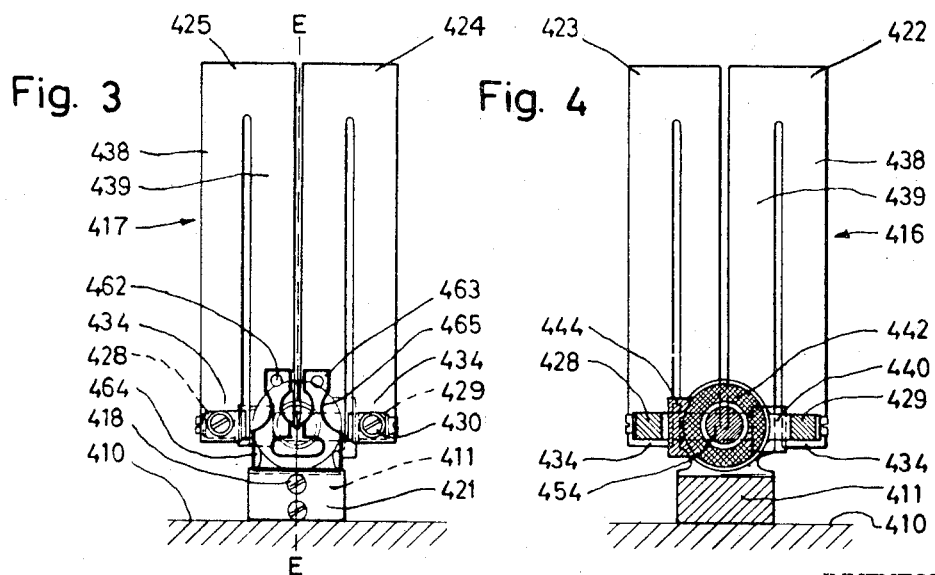

Filed Feb. 7, 1966  3 Sheets-Sheet 3

INVENTORS
KLAUS ANDREAS SPARING
WILHELM PAUL TILSE
BY
Davis, Hoxie, Faithfull & Hapgood
ATTORNEYS

United States Patent Office 3,408,808
Patented Nov. 5, 1968

3,408,808
WATCH VIBRATOR
Klaus Andreas Sparing, Pforzheim, and Wilhelm Paul Tilse, Pforzheim-Birkenfeld, Germany, assignors to The United States Time Corporation, Waterbury, Conn., a corporation of Connecticut
Filed Feb. 7, 1966, Ser. No. 525,458
Claims priority, application Germany, July 13, 1965, U 11,883
12 Claims. (Cl. 58—23)

The present invention relates to horology and more particularly to a mechanical vibrator used as a frequency standard.

The use of mechanical vibrators of various types in horology is well known. In one type of construction two vibrators of equal mass are mounted on the same stationary base. The two vibrators oscillate in opposite directions at the same time so that their reactions to the base cancel each other. In that construction, when properly designed, the cancellation is complete and energy is not transmitted to the base and wasted. If the two opposed vibrators each oscillate along a straight line, as distinct from a curve or arc, then they are relatively simple to adjust to insure that they follow equal lengths of movement and are equal in mass.

When a balanced vibrator is used in horology its frequency must be exact and predetermined. It is difficult to achieve such exactness in production. In addition, when the vibrators are pulsed with an electronic feed-back amplifier, the electronic system itself has an inherent frequency which varies from unit to unit in production. For these reasons to obtain a watch of high accuracy, it is essential to be able to make a frequency adjustment on the finished vibratory system.

It is the objective of the present invention to provide a frequency adjusting device for a balanced vibratory system, which device is inexpensive to produce, accessible to the original installer and the repairman, re-adjustable to a repairman, and which will retain its adjustment in use.

In accordance with the present invention an auxiliary spring is provided which bridges two oppositely vibrating arms of a vibratory system. The frequency of the system is altered by changing the damping effect of the spring on each of the oscillating arms. When viewed from each of the adjusted arms, the spring, in effect, acts as an adjustable damping force. The spring is preferably in the form of a bendable blade.

Other objectives of the present invention will be apparent from the detailed description of a preferred embodiment, which is described in relationship to the accompanying drawings. In the drawings:

FIG. 1 is a side view of the oscillating system according to the present invention;

FIG. 2 is a top view of the oscillating system shown in FIG. 1;

FIG. 3 is a front view, taken in the direction of the arrow A of FIG. 1, of the oscillating system of FIGS. 1 and 2;

FIG. 4 is a cross-section taken along the line 4—4 of FIG. 1 in the direction of the arrows;

Figure 5:
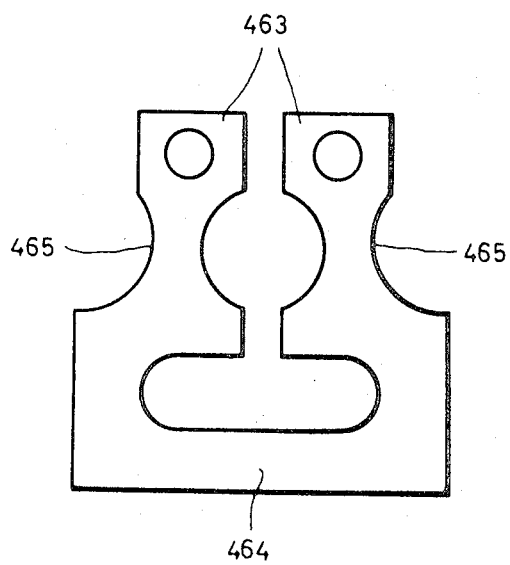
FIG. 5 is a side view of the auxiliary spring.
Figure 6:
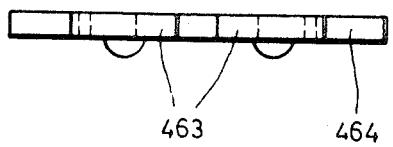
FIG. 6 is a top view of the auxiliary spring of FIG. 5.

The oscillating system is shown in FIGS. 1 to 4. It consists of a base 411 which is fixed onto a plate or frame member 410. The base 411 has, on its fore and back front faces, 412 and 414, respectively, oscillators 416 and 417, respectively.

The oscillators 416 and 417 are fixed to base 411 by means of screws 418. The oscillators 416 and 417 are the same in shape. Each oscillator 416 and 417 has a base portion 420 and 421, respectively, on which are arranged two inverted U-shaped partial oscillators. The arms (reeds) 422 and 423 are unitary with the base portion 420. Similarly the arms 423 and 425 are connected by connection piece 428. These connection pieces 428 and 429 are attached on the outer free end pieces of the concerned arms by screws 430. This connection is made in such a manner that these free end pieces 434 of the arms are practically rigidly connected with the plane front faces 435 of the connection pieces. The center of gravity of the partial oscillation system (comprising arms 423 and 425 and connection piece 428) oscillates in a straight line. Similarly the center of gravity of the partial system comprising arms 422 and 424 and connection piece 429 also oscillates in a straight line. This straight line motion is obtainable when the outer arm 438 of the concerned partial oscillator has approximately an equal length with the inner arm 439. In this construction the masses of the connection pieces (including the pieces arranged on them) are larger than the masses of the arms (including possible auxiliary masses arranged on the elastic parts of the arms). The connection pieces therefore overcome the tendency of the ends of the arms to move in arcs and the partial systems oscillate practically in a straight line.

An exciter coil 442 is fixed on connection piece 429 by means of the L-shaped coil holders 440 and 441. Holders 440 and 441 are screwed on the connection piece 429. A compensation weight 444 is glued on the side of the coil 442 opposite the connection piece 429. The mass is defined so that the center of gravity of the partial oscillation system (consisting of the arms 422 and 424, connection piece 429, holders 440 and 441, coil 442 and weight 444) is in the middle plane formed by the symmetry lines E—E of both oscillators 416 and 417, see FIG. 3. The connection piece 429 is fixed on the outer portions 438 of arms 422 and 424 in such a position that the center of gravity of this partial oscillation system oscillates in a straight line. A permanent magnet is fixed on the connection piece 428 by means of the L-shaped carriers 452 and 453 over cylindrical intermediate pieces of plastic 472 and 473. The magnet penetrates partially into the coil 442. When the coil is pulsed with electricity the magnet cooperates with the coil in such a manner that the connection piece 428 and 429 are made to oscillate in opposite directions and with equal energy content. The coil 442 is self controllingly excited by an electronic circuit (not shown) which controls and excites the coil. The circuit pulses the coil in the rhythm of the inherent frequency of the mechanical oscillation system so that an oscillation of a predetermined amplitude is maintained.

Compensation weights 460 and 461 are fixed on the carriers 452 and 453. The center of gravity of the partial oscillation system (consisting of the parts 423, 425, 428, 452, 453, 454, 472 and 473) is also placed in the middle plane E—E of the oscillation system. The connection piece 428 is fixed on the arms 423 and 425 so that its center of gravity also performs a straight lined motion. In this form of construction the centers of gravity of both partial oscillation systems are in the same plane and oscillate on a common straight line. This gives an optimum of rate accuracy.

The shank ends 463 of an approximately U-shaped auxiliary spring 464 are fixed on the two inner portions 439 of arms 424 and 425. The spring 465 is fastened on the face of the arms averted from the coil 442. The spot of fixation is chosen in such a manner that it is not a nodal point of the arms. Preferably spring 464 is joined to the arms by spot welding. Due to the U-shaped form of the auxiliary spring 464 both inner arms 439 are able to oscillate in simultaneous opposition to each other.

To obtain a fine adjustment of the oscillation frequency with the auxiliary spring 464 one has to bend it beyond the plane of the inner arms 439, as shown in FIG. 1. The bending of the auxiliary spring 464 is preferably made on its thinnest spot 465. Depending on how far it is bent and remains deformed, the auxiliary spring changes the spring constant of the system and therefore its frequency.

Figure 7:
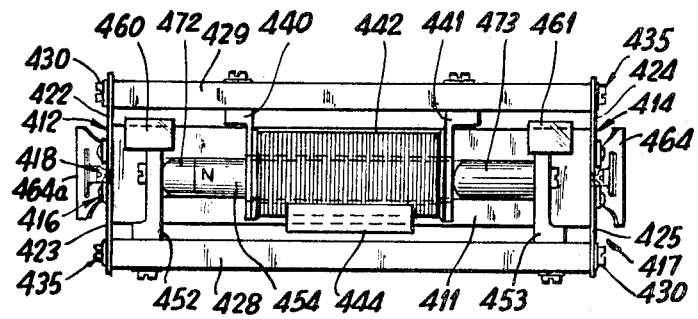
FIG. 7 is a top view, similar to FIG. 2, of another embodiment of the present invention.

An auxiliary spring 464a (shown in FIG. 7) can, similar to spring 464, also be provided on arms 422 and 423. The auxiliary springs 464, 464a may be in different shapes, especially when one auxiliary spring takes care of the coarse frequency adjustment and a second auxiliary spring of the finer frequency adjustment.

We claim:

1. A horological instrument in which a mechanical frequency standard is pulsed by an electrical circuit comprising
   a base,
   a first vibratory member connected to said base, a second vibratory member connected to said base,
   means to oscillate the members simultaneously in opposite directions, and
   an auxiliary spring which is connected to both vibratory members and is only connected to said base through said vibratory members.

2. A horological instrument as in claim 1, wherein the spring has a bendable portion, and wherein the bending of the spring provides a frequency adjustment for the standard.

3. A horological instrument as in claim 1, wherein each vibratory member is a U-shaped flat reed.

4. A horological instrument as in claim 1, and also including a second pair of vibratory members and means to oscillate them simultaneously in opposite directions in the same rhythm as the oscillations of the first pair of vibratory members, wherein one member of each pair is connected to a single member of the other pair by a rigid connection piece so that the center of gravity of each of the partial vibratory systems has a straight-lined motion.

5. A horological instrument as in claim 1, wherein a coil attached to the first member cooperates with a magnet attached to the second member to provide the oscillatory movement.

6. A horological instrument as in claim 1, wherein the auxiliary spring is connected to the vibratory members by spot welding.

7. A horological instrument as in claim 1, wherein the auxiliary spring has a narrow portion at which it is bent.

8. A horological instrument as in claim 1, wherein the mass of the vibratory members greatly exceeds the mass of the auxiliary spring.

9. A horological instrument as in claim 1, wherein the auxiliary spring is more pliable than the vibratory members.

10. A horological instrument as in claim 1, wherein the auxiliary spring is a spring blade.

11. A horological instrument as in claim 1, wherein the auxiliary spring is U-shaped and the ends of the U are attached to the vibratory members.

12. A horological instrument as in claim 1, wherein there is an additional auxiliary spring also attached to the vibratory members, which second auxiliary spring is smaller than the first auxiliary spring and gives a fine adjustment.

References Cited

UNITED STATES PATENTS

| | | | |
|---|---|---|---|
| 3,221,120 | 11/1965 | Mooney et al. | 310—25 |
| 3,286,453 | 11/1966 | Baehni | 331—157 |

RICHARD B. WILKINSON, *Primary Examiner.*

E. C. SIMMONS, *Assistant Examiner.*